United States Patent Office 3,409,872
Patented Nov. 5, 1968

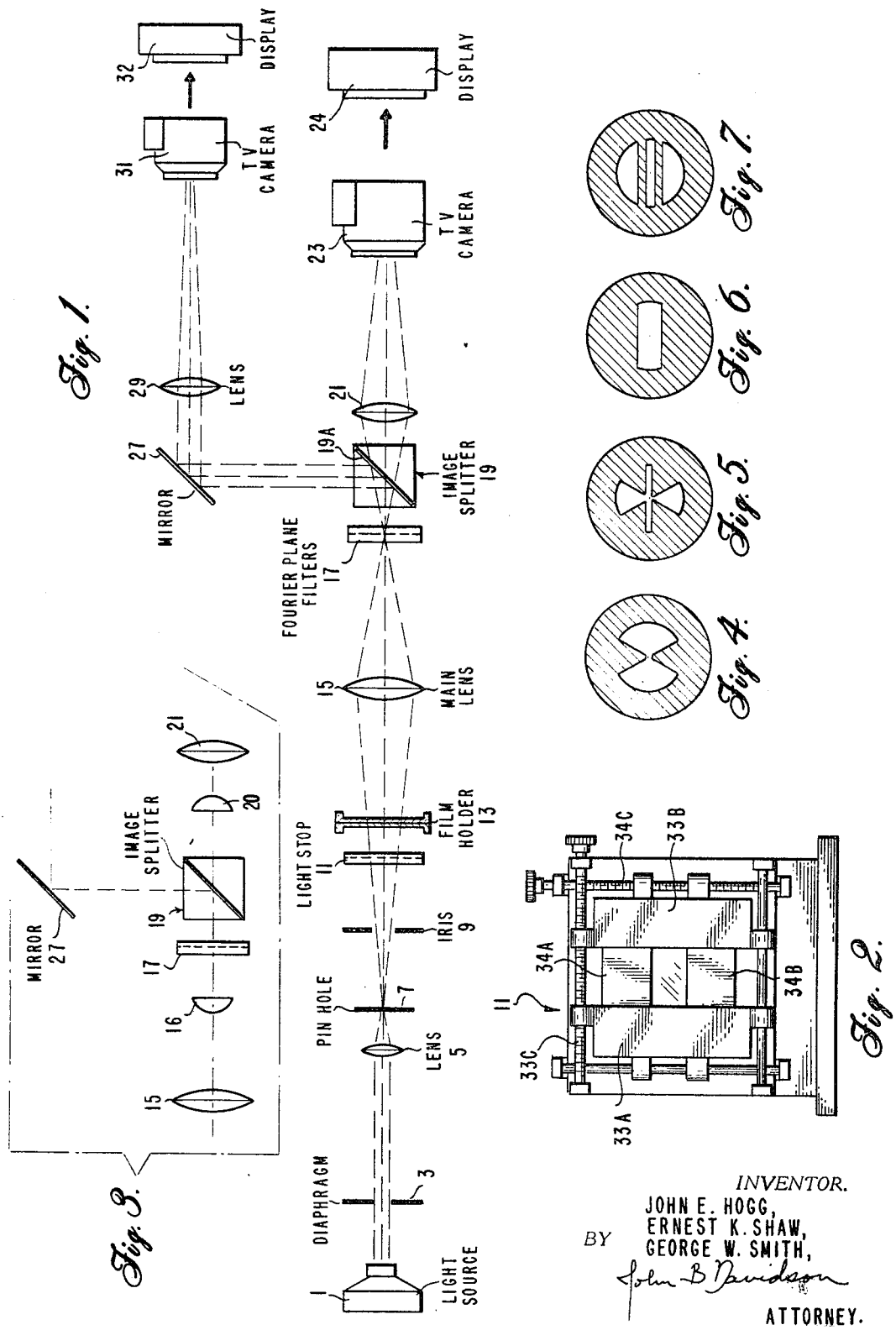

3,409,872
OPTICAL DIFFRACTION SYSTEM FOR ANALYZ-
ING AND PROCESSING SEISMIC DATA
John E. Hogg, Ernest K. Shaw, and George W. Smith,
Calgary, Alberta, Canada, assignors to Esso Production
Research Company, a corporation of Delaware
Filed Dec. 5, 1966, Ser. No. 599,092
7 Claims. (Cl. 340—15.5)

ABSTRACT OF THE DISCLOSURE

In an apparatus for optically processing seismic data, monochromatic light is passed from a substantially point source to a first positive lens through a variable light transmissivity seismogram and light stop means is positioned in the Fourier transform plane of the positive lens on the opposite side of the lens from the source to block out selected light rays impinging on the Fourier transform plane. Display means is positioned on the opposite side of the light stop means from the lens to display light rays impinging thereon. Preferably, an image splitter is positioned between the light stop means and the display means to divide the filtered light into two paths, and a second positive lens is positioned to intercept light from the image splitter that is not directed to the display means. A second display means positioned in the Fourier transform plane of the second positive lens permits display of the Fourier transform of the filtered seismogram so that the Fourier transform and the filtered seismogram itself can be simultaneously viewed.

This invention relates to the processing of seismic records, and more particularly to optical processing of seismograms using a coherent light source.

In the seismic technique of geophysical prospecting, a seismic disturbance is produced at a given location on the earth and resulting waves are detected, as by geophones located at one or more locations more or less spaced from said given location of the seismic disturbance. Some of the seismic energy is reflected from various reflecting horizons in the earth and, when detected, produces distinct events on data traces produced from the output signal of the geophones. The traces are recorded either in digital or analog form and are subsequently processed and analyzed to glean geological information therefrom.

In addition to seismic energy reflected from reflecting horizons in the earth, the geophones also detect other seismic energy which generally can be considered as noise inasmuch as it is undesirable from the point of view of the geophysicist. Such energy is produced by ground roll, air waves, reflections or refractions from localized reflectors or refracting horizons, reverberations from near surface earth layers, such as a water layer covering the earth or the weathering layer, and from other seismic sources such as the wind and vehicles moving near the location of the seismic observation. As a result, the desired information in seismograms is obscured and, for this reason, it is desirable to operate on the seismogram, as by filtering, to aid the geophysicist in distinguishing true reflections from the interfering and obscuring seismic events that inevitably accompany the desired reflections on a seismic record.

One type of apparatus used for filtering that has found favor among some geophysicists in recent years is an optical device making use of a coherent light source and a Fraunhaufer lens system. The coherent light is customarily provided by a laser light source through a pin hole positioned at the focal point of the first lens of the Fraunhaufer system. The first lens of the system collimates the light impinging thereon from the source and the light is transmitted to the second lens of the system through a seismogram that is formed on a photographic film or plate whereon each trace of the seismogram varies in light transmissivity in accordance with the amplitude of the output signal of the geophone from which the trace was formed. The seismogram produces a diffraction pattern which is transmitted to the second lens of the Fraunhaufer system. At the focal point of the second and third lenses of the Fraunhaufer system there is produced a two-dimensional Fourier transform of the total seismogram. If the light is permitted to pass unimpeded between the second and third lenses, the third lens will transmit to a screen or photosensitive film in the focal plane thereof an image of the seismogram interposed between the first and second lenses. Various light stops can be injected into the focal plane between the second and third lenses, which will act as filters to remove undesired events from the seismogram image produced by light from the third lens.

All lenses in the system described above must be of very high quality. They must be as free as possible from all aberrations, except chromatic aberration, which is immaterial. Furthermore, the lens should be coated to suppress reflections from their surfaces. It is most important that there be no bubbles inside the glass and that all surfaces, both internal and external, be free from dirt. With coherent illumination, any bubbles or specks of dust give rise to prominent diffraction rings. One of the difficulties of the system described above is that a large number of lenses is required thereby inasmuch as every lens that is used multiplies the chances of contamination and distortion of the output of the system. Another disadvantage is a lack of flexibility in operation occasioned by the necessity of taking repeated photographs of the final, corrected seismic section in order to determine the nature and amount of filter required to optimize the final, corrected seismic section. Therefore, it is one object of the invention to provide an optical system for correcting seismograms making use of a coherent light source and a minimum number of optical lenses. Still another object of the invention is to provide a system making use of a minimum number of optical lenses having a maximum amount of flexibility insofar as determining the appropriate kind of filter and amount of filtering necessary to correct a seismic section in an optimum manner.

Other objects and features of the invention not apparent from the above discussion will become evident upon consideration of the following detailed description thereof when taken in connection with the accompanying drawings, wherein:

FIG. 1 is a simplified perspective view of one embodiment of the invention;

FIG. 2 is a frontal, cross-sectional view of the image reducer illustrated in FIG. 1;

FIG. 3 is a view of components of the system of FIG. 1 illustrating another embodiment of the invention that permits a one-dimensional frequency spectrum rather than a two-dimensional frequency spectrum of a seismogram;

FIGS. 4–6 are sectional views of apparatus suitable for use with the apparatus of FIG. 1; and FIG. 7 is a sectional view of a filter suitable for use with the apparatus of FIG. 3.

With reference now to the seismogram processing apparatus shown in FIG. 1, there is illustrated a source of coherent light 1, which may be a gas laser source of conventional design. A condensing lens 5 is positioned in line with the light beam of the laser 1. Lens 5 functions to condense the light intercepted thereby to substantially a point source. Interposed between the lens 5 and the laser 1 is a diaphragm 3. At the focal point of the lens 5 there may be positioned a light stop or mask 7 having a pin hole for insuring a substantially point source of light for the system. The light from the point source is directed at a main positive lens 15, here illustrated as a double convex lens, which preferably has a relatively large aperture (5 centimeters or more) combined with a small $f$ number (about 6). Interposed between the pin hole point source 7 and the positive lens 15 are, in order, an iris 9 for eliminating stray reflections, a light stop 11 having an adjustable rectangular aperture, and holder 13 for holding a photographic film or plate on which a seismogram has been printed in such a form that each trace is variable in light transmissivity in accordance with the amplitude of the seismic signal recorded thereby. Preferably, the film is held between glass plates and is coated with a liquid that has the same refractive index as the film base. The plates preferably are formed of optically flat glass. Ordinary one-quarter inch polished plate glass has been found to have satisfactory optical characteristics. Holders of this nature are known to the art and will not be further discussed herein. The film may be of 35 millimeter size, and the seismogram recorded thereon may be a variable area type, variable density type, pulse-width modulated type, or other known type of photographic recording wherein the light transmissivity of a trace varies in accordance with the amplitude of the seismic signal recorded thereby. The film holder 13 is positioned at a distance from the lens 15 greater than the focal length of the lens.

When no diffraction obstacle is placed in the path of the light between the pin hole 7 and the lens 15, light passing through the lens will converge at a point which may be termed the image point of the pin hole. In a plane normal to a line between the pin hole in member 7 and the image point (which may be termed the frequency function plane or Fourier plane), there is positioned a filter holder 17 for holding filter members to be described below.

Light rays passing through the filter holder 17 and the film held thereby impinge upon an image splitter 19. The image splitter may be of the right angle prism type sold by the Edmunds Scientific Company of Barrington, N.J., a half silvered mirror, or other device for permitting a portion of light rays incident to a planar surface thereof to pass through the surface and the remainder to be reflected by the surface at an angle thereto. The reflected portion of the light is transmitted to a mirror 27 where it is re-reflected through a focusing lens 29 onto the detector tube of a television camera 31. The output of the camera is connected to a television screen display in the usual manner for closed circuit television systems. The portion of the light passing through the planar surface 19A of image splitter 19 is directed to a focusing lens 21 and is directed at a television camera 23. The output of the television camera 23 is applied to a television screen display 24 as described above for camera 31 and display unit 32. Lens 29 must focus non-diffracted light from the light source at a point on television camera 31 inasmuch as television camera 31 is meant to display the image that would appear at the Fourier plane at which holder 17 is positioned. Lens 21 is meant only to produce, at the TV camera, an image of the film placed in holder 13, if there is no filtering element in holder 17. A photographic recording means or a ground glass screen also may be placed on the far side of the Fourier or frequency plane from lens 15 when it is desired to view directly or to record an image at that point.

As indicated above, with the laser 1 energized and with no film or other interfering obstacles in film holder 13, there will appear at the Fourier plane at which filter holder 17 is positioned, a pin point of light substantially the same as the pin hole through which light passes in member 7. However, if a photographic film containing a seismic section is placed in the film holder 13 such that it intercepts light passing from the laser through the pin hole member 7 and through the openings in iris 9 and member 11, there will be produced a diffraction pattern which will result in the production in the Fourier plane of a two-dimensional Fourier transform spectrum. In other words, the light impinging on an object in the Fourier plane will be dispersed about the axis of the system in the same manner as a Fraunhaufer diffraction pattern wherein the presence of light at any point is indicative of a frequency component in the photographic transparency held by holder 13, the distance from the central axis of the Fourier plane being proportional to the frequency of that component. The intensity of the light is proportional to the relative intensity of that component, and the radial position in the Fourier plane is indicative of the angle with respect to the horizontal of the seismogram in holder 13 of components in the seismogram having a given frequency indicated by their distance from the central axis in the Fourier plane. The image of the light impinging on the Fourier plane in passing therethrough will be displayed by the display unit 32 of TV camera 31 by virtue of the reflected light of image splitter 19 that is re-reflected by mirror 27 and focused on the TV camera 31 by lens 29. In other words, the effect of the image splitter 19, mirror 27, and lens 29 would be the same as if the television camera lens were moved into the Fourier plane replacing filter holder 17. The light rays, after passing through the filter plane and through the image splitter 19, will appear in the plane of lens 21 to reproduce the seismic section printed on the photographic film by holder 11. Therefore, the television camera 23 will see not the light ray image that would be viewed at the Fourier plane, but a reconstruction of the seismogram. Any light stops placed in the filter plane will result in frequency components intercepted by the light stops being removed from the picture reproduced by the television camera and television screen display unit 24. Simultaneously, the light dots or components will be eliminated from the two-dimensional Fourier spectrum reproduced by the television camera 31 and display unit 32. Suitable filters are well known to the art and may take the shape of wedges as illustrated in FIGS. 4 and 5, or openings as illustrated in FIG. 6. Light rays passing through the Fourier transform plane at small angles from the horizontal are generally attributable to ground roll, and light rays passing through the Fourier plane at intermediate angles generally is the result of steeply dipping refractions and multiple reflections. This situation is illustrated in FIG. 7.

When it is desired to process only a portion of the seismogram, the horizontal shutters 34A and 34B of member 11 (see FIG. 2) are brought together by rotating worm gear 34C. Likewise, shutter members 33A and 33B may be brought together by rotating worm gear 33C. The result is that any portion of the seismogram may be viewed by adjusting the position of member 11 and by suitably positioning the shutters carried thereby.

Under certain circumstances it is desirable to view the Fourier transform appearing in the Fourier plane as a one-dimensional presentation rather than as a two-dimensional presentation using the system shown in FIG. 1. In such a case it is necessary only to position a cylindrical lens 16 between lens 15 and filter holder 17, and to position a second cylindrical lens 20 between the image splitter 19 and the lens 21. In this circumstance the Fourier transform displayed by TV screen display unit 32 will be such that the image on the screen will be as if the seismogram were displayed with the traces spaced in order from left to right, but the traces being indicative of frequency rather than of amplitude going in both directions from the central axis. In other words, trace 1 would correspond to trace 1 of the seismogram, but the light images on trace 1 would be indicative of frequency components in the trace, increasing frequency being expressed as distance from the horizontal axis. The light stops of FIG. 7 inserted in the filter holder 17 would be effective as a high-pass filter, and that of FIG. 6 would be effective as a low-pass filter. In operation, using the apparatus of FIG. 1, a light stop filter member will be inserted in the unit and rotated or otherwise adjusted while simultaneously viewing display screens 32 and 24. Using a wedge-type filter, for example, the wedge would be rotated to remove interfering events previously identified on the seismogram. Assume, for example, that there appears on the display screen 24 an event which it is suspected obscures events containing useful geologic information. A wedge-type filter would be inserted in the member 17 and rotated until this event disappears. If the event is within the range containing useful seismic information, it may be necessary to substitute another filter having a narrower wedge, for example, or a simple line, and position it at substantially the same angle as the first filter and make fine adjustments until the event again disappears. An image of the filter, manifestly, will appear on screen 32 so that its position can be readily ascertained. By simultaneously observing the filtered seismogram and the frequency spectrum thereof, accurate adjustments can be made which do not interfere with the display of useful seismic information. The tedious cut and try methods of the prior art are eliminated since there is no necessity for making a multitude of photographic impressions. After a suitable position for the filter light stop has been found, the camera and lens 21 can be removed, a camera can be placed at a suitable position relative to the phase splitter so as to intercept light previously intercepted by lens 21, and a corrected photographic seismic section can be produced.

Using the apparatus of FIG. 3, substantially the same type of adjustments can be made using suitable filters. It may be seen on the screen 32, for example, that certain frequency components appear on some traces but not on others. Therefore, it may be desirable to remove from all traces those components having such a frequency, as with a light stop having a horizontal bar or wire (see FIG. 7) so that there will be no interference thereby with other events that may be buried or obscured by events of that particular frequency.

Having described the principle of the invention and the best mode in which we have contemplated applying that principle, we wish it to be understood that the apparatus described is illustrative only and that other means can be employed without departing from the true scope of the invention defined in the following claims.

We claim:
1. Apparatus for optically processing seismic data, comprising:
   a source of monochromatic light having coherent diverging rays;
   a first positive lens positioned to intercept light from said source;
   means positioned between said source and said lens for holding a seismogram comprising a plurality of variable light transmissivity traces in the path of diverging light rays passing directly from said source to said lens through said seismogram;
   light stop means positioned in the Fourier transform plane of said lens on the opposite side of said lens from said source for blocking selected light rays impinging on said Fourier transform plane of said lens; and
   display means positioned on the opposite side of said light stop means from said lens for displaying light waves passed by said light stop means.
2. The combination of claim 1 further including:
   image splitter means positioned between said light stop means and sail display means for splitting light passed by said light stop means into first and second paths, said first path including said display means;
   a second positive lens positioned in said second path to intercept light from said image splitter means; and
   second display means positioned in the Fourier transform plane of said second positive lens for displaying light impinging thereon.
3. The combination of claim 2 further including:
   first cylindrical lens positioned between said first positive lens and said light stop means; and
   second cylindrical lens positioned between said image splitter means and said first display means.
4. The combination of claim 2 wherein each of said first and second display means comprises a television camera and a television display means connected to said camera to display images detected by said camera.
5. A method of optically filtering a seismogram comprising a plurality of parallel variable light transmissivity traces, said method comprising:
   passing monochromatic light through said seismogram to a positive lens;
   splitting light from said lens into two paths at a location on the far side of the Fourier transform plane of said lens from said lens;
   intercepting light in one of said paths with a second positive lens;
   displaying light in the other of said paths;
   displaying light impinging on the Fourier transform plane of said second lens; and
   selectively blocking light rays in the Fourier transform plane of said first lens.
6. Apparatus for optically analyzing complex data recorded on a light transmissive recording medium comprising:
   means including a source of monochromatic coherent light, a support for said recording medium, and positive lens means for producing a frequency diffraction pattern of said complex data in the Fourier transform plane of said lens;
   light stop means positioned in the Fourier transform plane of said lens on the opposite side of said lens from said source for blocking selected light rays impinging on said Fourier transform plane of said lens;
   first display means positioned on the opposite side of said light stop means from said lens for displaying light waves passed by said light stop means;
   image splitter means positioned between said light stop means and said display means for splitting light passed by sald light stop means into first and second paths;
   said first path including said first display means;
   a second positive lens positioned to enter passed light from said image splitter means in said second path; and
   second display means positioned in the Fourier transform plane of said second positive lens for displaying light impinging thereon.
7. The combination of claim 6 further including:
   first cylindrical lens positioned between said first positive lens and said light stop means; and
   second cylindrical lens positioned between said image splitter means and said first display means.

References Cited
UNITED STATES PATENTS

| | | | |
|---|---|---|---|
| 3,240,108 | 3/1966 | Lehan et al. | 88—1 |
| 3,305,834 | 2/1967 | Cooper et al. | 88—1 |

RODNEY D. BENNETT, *Primary Examiner.*

C. E. WANDS, *Assistant Examiner.*